US012777017B2

(12) United States Patent
Qu et al.

(10) Patent No.: US 12,777,017 B2
(45) Date of Patent: Oct. 27, 2026

(54) BORDER GATEWAY PROTOCOL (BGP) FLOWSPEC ORIGINATION AUTHORIZATION USING ROUTE ORIGIN AUTHORIZATION (ROA)

(71) Applicant: Huawei Technologies Co., Ltd., Shenzhen (CN)

(72) Inventors: Yingzhen Qu, Addison, TX (US); Alvaro Enrique Retana, Addison, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 18/399,050

(22) Filed: Dec. 28, 2023

(65) Prior Publication Data

US 2024/0137338 A1 Apr. 25, 2024

Related U.S. Application Data

(63) Continuation of application No. PCT/US2021/039602, filed on Jun. 29, 2021.

(51) Int. Cl.
*H04L 9/40* (2022.01)
*H04L 45/02* (2022.01)

(52) U.S. Cl.
CPC .......... *H04L 63/0236* (2013.01); *H04L 45/04* (2013.01); *H04L 63/101* (2013.01)

(58) Field of Classification Search
None
See application file for complete search history.

(56) References Cited

U.S. PATENT DOCUMENTS

2021/0067377 A1* 3/2021 Beck .......................... H04L 9/14
2021/0105250 A1* 4/2021 Grinius ............... H04L 61/5084

OTHER PUBLICATIONS

Mohapatra et al., Title: "BGP Prefix Origin Validation", RFC 6811, Jan. 2013. (Year: 2013).*
Hares, S., et al., "An Information Model for Basic Network Policy and Filter Rules," draft-hares-idr-flowspec-combo-01.txt, Internet-Draft, IDR Working Group, Mar. 5, 2016, 89 pages.
Lepinski, M., et al., "A Profile for Route Origin Authorizations (ROAs)," Internet Engineering Task Force, RFC 6482, Feb. 2012, 9 pages.

* cited by examiner

*Primary Examiner* — Farid Homayounmehr
*Assistant Examiner* — Suman Debnath
(74) *Attorney, Agent, or Firm* — Conley Rose, P.C.

(57) ABSTRACT

A method performed by a network node of a receiving autonomous system (AS) for verifying that a sending AS is authorized to issue a Border Gateway Protocol (BGP) flow specification (FlowSpec). The network node receives a BGP update message from a sending AS. The BGP update message includes a FlowSpec associated with a prefix of an AS. The network node obtains an out-of-band Flowspec AS authorization list indicating autonomous systems (ASes) that are authorized to issue the FlowSpec for the prefix of the AS. The network node determines whether the sending AS is included on the out-of-band Flowspec AS authorization list for the prefix of the AS. The network node rejects the FlowSpec when the sending AS is not on the out-of-band FlowSpec AS authorization list for the prefix of the AS.

18 Claims, 6 Drawing Sheets

BORDER GATEWAY PROTOCOL (BGP) FLOWSPEC ORIGINATION AUTHORIZATION USING ROUTE ORIGIN AUTHORIZATION (ROA)

CROSS-REFERENCE TO RELATED APPLICATIONS

This application is a continuation of International Patent Application No. PCT/US2021/039602 filed on Jun. 29, 2021, by Futurewei Technologies, Inc., and titled "Border Gateway Protocol (BGP) Flowspec Origination Authorization Using Route Origin Authorization (ROA)," which is incorporated by reference in its entirety.

TECHNICAL FIELD

The present disclosure is generally related to network communications, and specifically to various systems and methods for BGP Flow Specification (FlowSpec) origination authorization using Route Origin Authorization (ROA).

BACKGROUND

The Internet is an interconnection of autonomous systems (ASes) that use BGP to exchange routing or reachability information. An autonomous system (AS) is a set of Internet routable Internet protocol (IP) prefixes belonging to a network or a collection of networks that are all managed, controlled and supervised by a single entity or organization. An AS utilizes a common routing policy controlled by the entity. BGP relies on trust among network operators to secure their systems since there is no built-in validation in BGP. To make the Internet safer, BGP can use Resource Public Key Infrastructure (RPM). RPKI is a framework designed to secure routing infrastructure. RPKI is a resource certification that provides evidence for the authority to use specific IP version 4 (IPv4), IP version 6 (IPv6), and autonomous system number (ASN) resources. Route origin authorizations (ROAs) are digitally-signed objects that fix an address to an AS. An ROA is signed by the address holder which is based on the X.509 PKI certificate standards. ROAs are a method for verifying that a prefix or an IP address holder has authorized an AS to originate route objects in the inter-domain routing environment for that prefix.

SUMMARY

A first aspect relates to a method performed by a network node of a receiving AS for verifying that a sending AS is authorized to issue a BGP flow specification (FlowSpec). The method includes the network node receiving a BGP update message from a sending AS, the BGP update message includes a FlowSpec associated with a prefix of an AS. The network node obtains an out-of-band Flowspec AS authorization list indicating ASes that are authorized to issue the FlowSpec for the prefix of the AS. The network node determines that the sending AS is authorized to issue the FlowSpec when the sending AS is included on the out-of-band FlowSpec AS authorization list for the prefix of the AS. The network node determines whether the sending AS is a closest neighboring AS to the receiving AS along a best-match unicast route for a destination prefix. The network node accepts the FlowSpec when the sending AS is the closest neighboring AS to the receiving AS along the best-match unicast route for the destination prefix and the sending AS is authorized to issue the FlowSpec for the prefix of the AS. The network node performs a traffic flow action associated with the FlowSpec when the network node receives traffic that matches a set of traffic parameters specified by the FlowSpec.

In a first implementation form of the method according to the first aspect, the network node rejects the FlowSpec when the sending AS is not included on the out-of-band FlowSpec AS authorization list.

In a second implementation form of the first aspect as such or any preceding implementation form of the first aspect, the network node rejects the FlowSpec when the sending AS is not the closest neighboring AS to the receiving AS along a best-match unicast route for a destination prefix.

In a third implementation form of the first aspect as such or any preceding implementation form of the first aspect, the out-of-band Flowspec AS authorization list is encoded in a digitally signed Route Origination Authorization (ROA) object.

In a fourth implementation form of the first aspect as such or any preceding implementation form of the first aspect, the out-of-band Flowspec AS authorization list is encoded in a digitally signed Flowspec AS authorization list object.

In a fifth implementation form of the first aspect as such or any preceding implementation form of the first aspect, the digitally signed Flowspec AS authorization list object is obtained from a resource public key infrastructure (RPKI) repository.

In a sixth implementation form of the first aspect as such or any preceding implementation form of the first aspect, wherein determining whether the sending AS is the closest neighboring AS to the receiving AS along a best-match unicast route for a destination prefix includes determining whether the sending AS is both in a left-most position of an AS_PATH attribute of a Flow spec route received via an External Border Gateway Protocol (eBGP) and in the left-most position of the AS_PATH attribute of the best-match unicast route for the destination prefix embedded in the Flowspec.

In a seventh implementation form of the first aspect as such or any preceding implementation form of the first aspect, wherein determining whether the sending AS is the closest neighboring AS to the receiving AS along a best-match unicast route for a destination prefix includes using a secured AS path list that is part of a routing table of the network node.

In an eighth implementation form of the first aspect as such or any preceding implementation form of the first aspect, the secured AS path list is obtained using BGP security (BGPsec).

A second aspect relates to a network node of a receiving AS for verifying that a sending AS is authorized to issue a BGP FlowSpec. The network node includes a memory storing instructions; a processor coupled to the memory, the processor configured to execute the instructions to cause the network node to receive a BGP update message from the sending AS. The BGP update message includes a FlowSpec associated with a prefix of an AS. The processor further configured to execute the instructions to cause the network node to obtain an out-of-band Flowspec AS authorization list indicating ASes that are authorized to issue the FlowSpec for the prefix of the AS. The processor further configured to execute the instructions to cause the network node to determine that the sending AS is authorized to issue the FlowSpec when the sending AS is included on the out-of-band FlowSpec AS authorization list for the prefix of the AS. The processor further configured to execute the instructions to cause the network node to determine whether the sending AS is a closest neighboring AS to the receiving AS along a best-match unicast route for a destination prefix. The processor further configured to execute the instructions to cause the network node to accept the FlowSpec when the sending AS is the closest neighboring AS to the receiving AS along the best-match unicast route for the destination prefix and the sending AS is authorized to issue the FlowSpec for the prefix of the AS. The processor further configured to execute the instructions to cause the network node to perform a traffic flow action associated with the FlowSpec when the network node receives traffic that matches a set of traffic parameters specified by the FlowSpec.

In a first implementation form of the network node according to the second aspect, the processor executes the instructions to reject the FlowSpec when the sending AS is not included on the out-of-band FlowSpec AS authorization list.

In a second implementation form of the second aspect as such or any preceding implementation form of the second aspect, the processor executes the instructions to reject the FlowSpec when the sending AS is not the closest neighboring AS to the receiving AS along the best-match unicast route for the destination prefix.

In a third implementation form of the second aspect as such or any preceding implementation form of the second aspect, the out-of-band Flowspec AS authorization list is encoded in a digitally signed ROA object.

In a fourth implementation form of the second aspect as such or any preceding implementation form of the second aspect, the out-of-band Flow spec AS authorization list is encoded in a digitally signed Flowspec AS authorization list object.

In a fifth implementation form of the second aspect as such or any preceding implementation form of the second aspect, the digitally signed Flow spec AS authorization list object is obtained from an RPKI repository.

In a sixth implementation form of the second aspect as such or any preceding implementation form of the second aspect, the processor executes the instructions to determine whether the sending AS is the closest neighboring AS to the receiving AS along the best-match unicast route for a destination prefix includes determining whether the sending AS is both in a left-most position of an AS_PATH attribute of a Flowspec route received via an eBGP and in the left-most position of the AS_PATH attribute of the best-match unicast route for the destination prefix embedded in the Flowspec.

In a seventh implementation form of the second aspect as such or any preceding implementation form of the second aspect, the processor executes the instructions to use a secured AS path list that is part of a routing table of the network node in determining whether the sending AS is the closest neighboring AS to the receiving AS along the best-match unicast route for the destination prefix. The secured AS path list is obtained using BGPsec.

A third aspect relates to a method performed by a network node of a receiving AS for verifying that a sending AS is authorized to issue a BGP FlowSpec. The method includes the network node receiving a BGP update message from a sending AS. The BGP update message includes a FlowSpec associated with a prefix of an AS. The network node obtains an out-of-band Flowspec AS authorization list indicating ASes that are authorized to issue the FlowSpec for the prefix of the AS. The network node determines whether the sending AS is included on the out-of-band Flowspec AS authorization list for the prefix of the AS. The network node rejects the FlowSpec when the sending AS is not on the out-of-band FlowSpec AS authorization list for the prefix of the AS.

In a first implementation form of the method according to the third aspect, the out-of-band Flowspec AS authorization list is encoded in a digitally signed ROA object.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

BGP is a standardized exterior gateway protocol designed to exchange routing and reachability information between ASes on the Internet (i.e., an inter-AS routing protocol). A primary function of a BGP speaking system is to exchange Network Layer Reachability Information (NLRI) with other BGP systems. NLRI includes information on the list of ASes that reachability information traverses. BGP FlowSpec is a BGP extension that includes an NLRI that specifies various types of Layer 3 and Layer 4 parameters used to define a Flowspec. The Flowspec can be distributed to border or edge routers of a network to filter traffic that matches the criteria specified in the Flowspec (e.g., to prevent and/or stop a distributed denial-of-service (DDoS) attack). As will described herein, while BGP Flowspec can be used to prevent malicious attacks, BGP Flowspec can also be used to maliciously filter authorized/normal traffic when originated by an unauthorized AS.

The disclosed embodiments provide several technical improvements over existing techniques including extending ROA to include a BGP FlowSpec AS authorization list indicating ASes that are authorized to send a Flowspec for a particular prefix. The disclosed embodiments reduce or eliminate the probability of BGP Flowspec being accepted when originated by an unauthorized AS. Thus, the disclosed embodiments increase network security by reducing malicious activities from occurring on the network.

Figure 1:
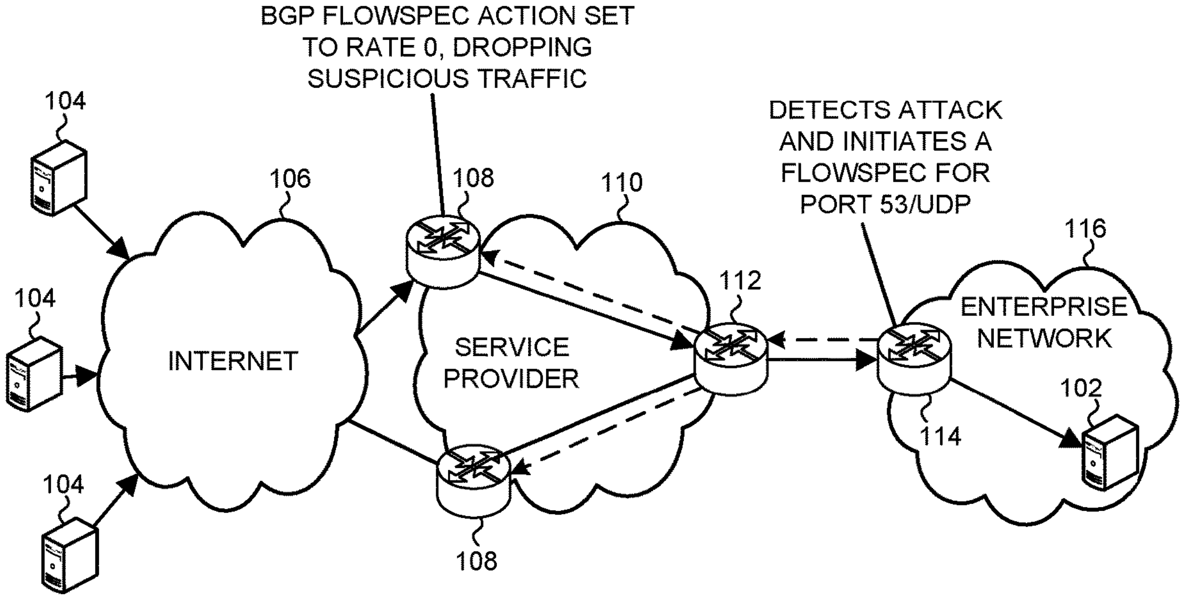
FIG. 1 is a schematic diagram illustrating a communication network in accordance with an embodiment of the present disclosure.

FIG. 1 is a schematic diagram illustrating a communication network in accordance with an embodiment of the present disclosure. In the depicted embodiment, a server 102 located in an enterprise network 116 provides services to one or more end-user devices 104. The one or more end-user devices 104 communicate with the server 102 via the Internet 106, which in turn is connected to border routers 108 of a service provider network 110 (as indicated by the solid arrows). The service provider network 110 provides Internet access to the devices on the enterprise network 116. The communications data from the end-user devices 104 are routed through the service provider network 110 to a border router 112. The border router 112 of the service provider network 110 communicates with a border router 114 of the enterprise network 116. The border router 114 routes the communications to the server 102.

In FIG. 1, when the border router 114 of the enterprise network 116 detects a denial-of-service attack targeted at the server 102 (e.g., on port 53/User Datagram Protocol (UDP) of the server 102 as depicted in FIG. 1), the border router 114 initiates a flow specification (Flowspec) or BGP Flowspec for port 53/UDP of the server 102. A Flowspec is an n-tuple (a sequence or ordered list of n elements, where n is a non-negative integer) comprising several matching criteria that can be applied to IP traffic. The Flowspec can be distributed as BGP NLRI in a BGP update message. A BGP update message is used for exchanging routing information between BGP peers (e.g., to advertise feasible routes that share common path attributes to a peer, or to withdraw multiple unfeasible routes from service). A given IP packet is said to match the defined flow when the IP packet matches all the specified criteria in the Flowspec (e.g., source prefix, destination prefix, IP Protocol, source or destination ports, L4 parameters, and packet specifics such as length, fragment and so on). The border router 114 transmits the Flowspec to the border router 112 of the service provider network 110 (as indicated by the dashed arrows). The border router 112 then forwards the Flowspec to the border routers 108 so that the DDoS attack can be stopped before entering the service provider network 110. The FlowSpec allows rapid deployment and propagation of filtering and policing functionality to mitigate the effects of the DDoS attack. For example, the FlowSpec allows for a dynamic installation of an action at the border routers 108 to either drop the traffic, inject the traffic in a different virtual routing and forwarding (VRF) instance for analysis, or allow the traffic, but police the traffic at a specific defined rate. In order to accomplish this, the border routers 108 create an access-list (ACL) with class-map and policy-map to implement the advertised rule in the Flowspec. An ACL will filter traffic coming in or out of a particular network interface. The border routers 108 compare each packet to the criteria of the access list and will either be permitted (or permitted with limitations) or dropped. A class-map is an entity in a router that classifies network traffic (i.e., defines traffic classes based on various match criteria). A policy map references the class maps and identifies a series of actions to perform based on the traffic match criteria.

Figure 2:
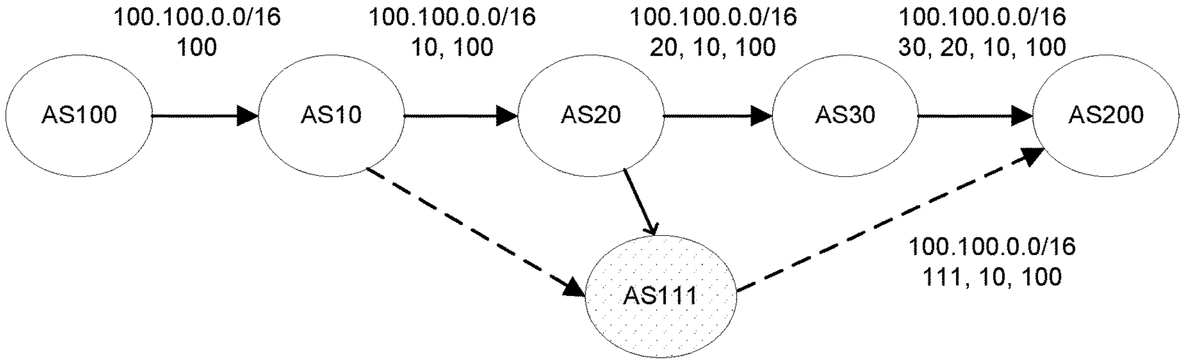
FIG. 2 is a schematic diagram illustrating a malicious rerouting of a BGP update message.

FIG. 2 is a schematic diagram illustrating a malicious rerouting of a BGP update message. As illustrated, a source AS (e.g., AS100) attempts to send the prefixes under its control to a destination AS (e.g., AS200) along an AS path AS100→AS10→AS20→AS30→AS200. An AS is a collection of connected IP routing prefixes under the control of one or more network operators on behalf of a single administrative entity or domain A prefix is a network address followed by a subnet mask. For example, in FIG. 2, AS100 sends the prefixes of AS100 (e.g., 100.100.0.0/16) in a NLRI field of a BGP update message to AS10. The prefixes indicate the range of IP addresses under the control of AS100. As will be further described, the NLRI field of a BGP update message can also include a Flowspec. The AS100 also appends an AS number of AS100 (i.e., 100) as part of a AS_PATH attribute in the BGP update message. The AS_PATH attribute is a mandatory attribute that uses a sequence of AS numbers to describe the inter-AS path, or AS-level route, to the destination specified by the NLRI (e.g., AS200 in FIG. 2). Simply put, the AS_PATH attribute records all of the ASes that a route passes through from the source AS100 to the destination AS200. For instance, in FIG. 2, when AS10 forwards the prefixes of AS100 (100.100.0.0/16) to AS20, AS10 prepends AS number 10 to the AS_PATH attribute in the BGP update message. The AS_PATH attribute now contains AS numbers 10, 100 as shown in FIG. 2. The BGP update message hops from AS to AS until the BGP update message reaches the AS that contains the destination IP address (i.e., AS200). Along the way, AS20 prepends AS number 20 to the AS_PATH attribute (20, 10, 100) in the BGP update message when the BGP update message is forwarded to AS30. AS30 prepends AS number 30 to the AS_PATH attribute (30, 20, 10, 100) in the BGP update message when the BGP update message is forwarded to the destination AS200. The AS_PATH attribute, along with other attributes, can then be used to identify the best path to a destination.

Currently, in the absence of explicit configuration, an AS that receives the BGP update message containing a Flowspec NLRI must validate the Flowspec NLRI. The Flowspec NLRI is considered feasible when and only when all of the three following conditions are true: (1) a destination prefix component is embedded in the Flowspec; (2) the originator of the Flowspec matches the originator of the best-match unicast route for the destination prefix embedded in the Flowspec (i.e., the unicast route with the longest possible prefix length covering the destination prefix embedded in the Flowspec), and (3) there are no “more-specific” unicast routes, when compared with the flow destination prefix, that have been received from a different neighboring AS than the best-match unicast route. The underlying concept is that the neighboring AS that advertises the best unicast route for a destination is allowed to advertise Flowspec information that conveys a destination prefix that is more or equally specific. Thus, as long as there are no “more-specific” unicast routes received from a different neighboring AS, which would be affected by that Flowspec, the Flowspec is validated successfully.

Additionally, the BGP Flowspec implementation must also enforce that the AS in the left-most position of the AS_PATH attribute of a Flowspec route received via the External Border Gateway Protocol (eBGP) matches the AS in the left-most position of the AS_PATH attribute of the best-match unicast route for the destination prefix embedded in the Flowspec NLRI. The AS in the left-most position of the AS_PATH attribute means the AS that was last added to the AS_SEQUENCE. The AS_SEQUENCE is a component of the AS_PATH attribute. The AS_SEQUENCE is an ordered set of ASes indicating a route that the BGP update message has traversed. The above requirement enables the exchange of BGP Flowspec NLRIs at Internet exchanges with BGP route servers while at the same time, for security reasons, prevents an eBGP peer from advertising an inter-domain Flow Specification for a destination prefix that it does not provide reachability information for. Comparing only the last AS added is sufficient for eBGP learned Flowspec NLRIs. Requiring a full AS_PATH match would limit origination of inter-domain Flowspec to the origin AS of the best-match unicast route for the destination prefix embedded in the Flow Specification only. As such, a full AS_PATH validity check may prevent transit ASes from originating inter-domain Flowspecs, which is not desirable.

However, as shown in FIG. 2, a malicious attack can occur where AS111 hijacks/intercepts the BGP update message containing the Flowspec NLRI from AS20. AS111 can then append the AS_PATH attribute with the AS number of AS111 (e.g., 111, 10, 100) and transmit the BGP update message to AS200. The Flowspec NLRI from AS111 will pass the above validation process because AS111 is now the best unicast path to reach network 100.100.0.0/16. AS111 can send a malicious Flowspec to AS200 requesting that AS200 drop/rate limit or redirect traffic sent to 100.100.0.0/16. Additionally, even though AS30 is in the path and is a valid node, AS30 can also send a Flowspec and request AS200 drop traffic to AS100 without AS100 knowing or agreeing that AS30 perform this request.

To reduce or eliminate the probability of a BGP Flowspec being originated by an unauthorized AS, the disclosed embodiments provide various systems and methods for extending a ROA object to include a BGP FlowSpec AS authorization list. The BGP FlowSpec AS authorization list indicates ASes that are authorized to send a Flowspec for a particular prefix. Alternatively, an ROA database server or repository (e.g., an RPKI repository) can be configured to create a new digitally signed BGP FlowSpec AS authorization list object. In accordance with the disclosed embodiments, ROAs are stored and obtainable from one or more repositories accessible to all network service providers, and in certain embodiments, to all Internet users. For example, one or more ROA database servers or repositories can be located on the Internet 106 or the service provider network 110 in FIG. 1.

Figure 3:
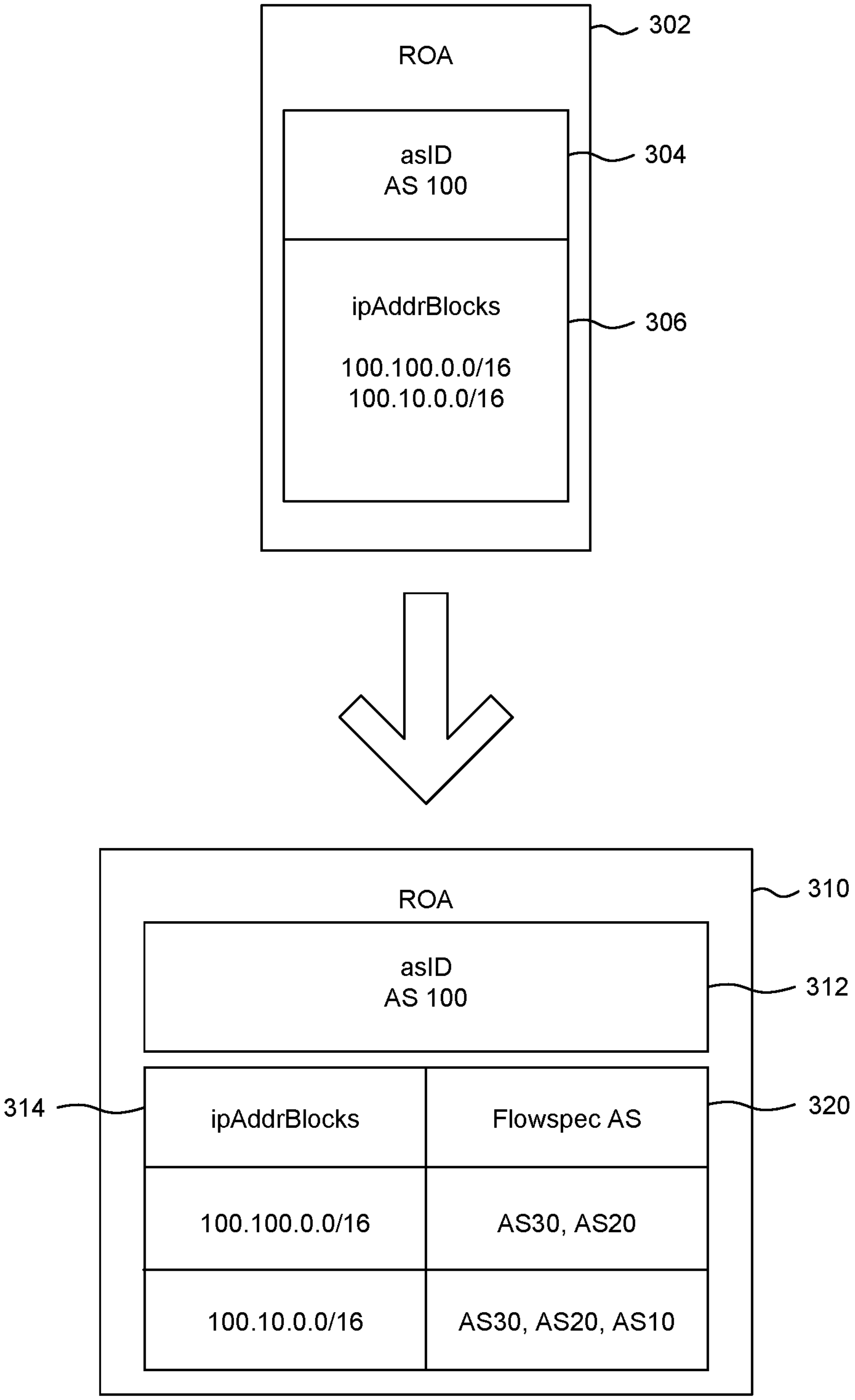
FIG. 3 is a schematic diagram illustrating a ROA object in accordance with an embodiment of the present disclosure.

FIG. 3 is a schematic diagram illustrating a ROA object that includes a BGP FlowSpec AS authorization list in accordance with an embodiment of the present disclosure. ROA 302 illustrates a typical ROA object. As stated above, a ROA is a cryptographically signed object that states which AS is authorized to originate a particular IP address prefix or set of prefixes. ROAs may only be generated for Internet number resources covered by a resource certificate of an AS. The ROA 302 includes an AS identifier (asID) 304 and an IP address blocks (ipAddrBlocks) 306. The asID 304 indicates an AS (i.e., AS number) authorized to originate a particular IP address prefix or set of prefixes indicated in the ipAddrBlocks 306.

In accordance with an embodiment of the present disclosure, the ROA 302 can be modified to include a BGP FlowSpec AS authorization list as indicated by ROA 310. ROA 310 includes asID 312, ipAddrBlocks 314, and BGP FlowSpec AS authorization list (Flowspec AS) 320. The asID 312 indicates an AS authorized to originate a particular IP address prefix or set of prefixes indicated in the ipAddrBlocks 314. The Flowspec AS 320 indicates one or more ASes authorized to send a Flowspec for a particular prefix in the ipAddrBlocks 314. For example, in the depicted embodiment, the Flowspec AS 320 indicates that AS30 and AS20 are authorized to send a Flowspec for prefix 100.100.0.0/16. Additionally, the Flowspec AS 320 indicates that AS30, AS20, and AS10 are authorized to send a Flowspec for prefix 100.10.0.0/16. An AS that receives a Flowspec can thus obtain the ROA 310 from an ROA repository and use the Flowspec AS 320 to verify that the sending AS is authorized to issue the Flowspec for the particular prefix.

Figure 4:
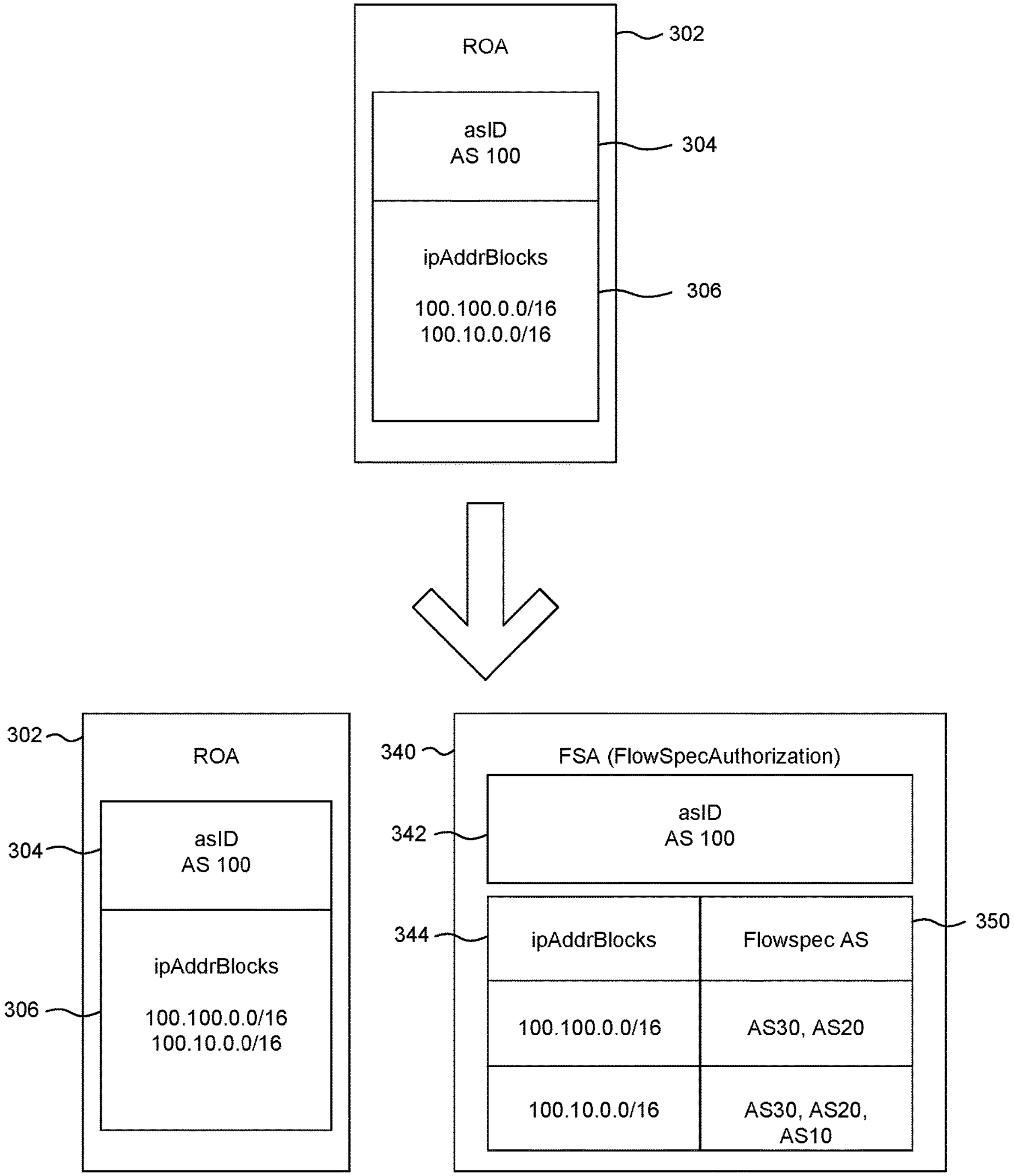
FIG. 4 is a schematic diagram illustrating a FlowSpec authorization object in accordance with an embodiment of the present disclosure.

FIG. 4 is a schematic diagram illustrating a FlowSpec authorization (FlowSpecAuthorization) object 340 that includes a BGP FlowSpec AS authorization list 350 in accordance with an embodiment of the present disclosure. In an alternative embodiment, instead of modifying the ROA 302 as shown in FIG. 4 (described in FIG. 3), an ROA database server can generate both the ROA 302 and the FlowSpecAuthorization object 340 as two separate digitally signed objects. The FlowSpecAuthorization object 340 includes asID 342, ipAddrBlocks 344, and a Flowspec AS 350. The asID 342 indicates an AS authorized to originate a particular IP address prefix or set of prefixes indicated in the ipAddrBlocks 344. The Flowspec AS 350 indicates one or more ASes authorized to send a Flowspec for a particular prefix in the ipAddrBlocks 344. Both the ROA 302 and the FlowSpecAuthorization object 340 can be obtained by a BGP router from a ROA server or repository as part of the route origination verification process.

Figure 5:
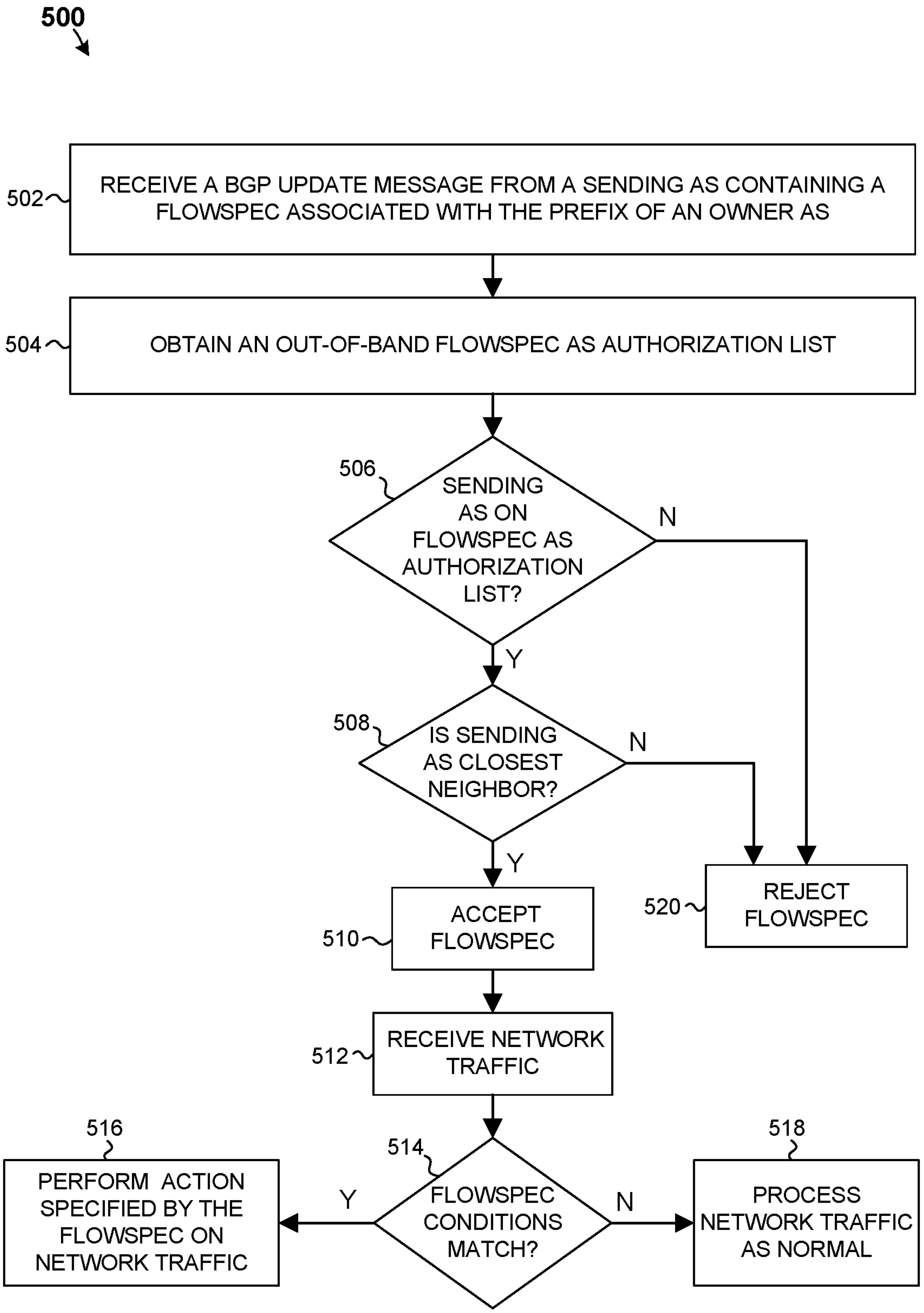
FIG. 5 is a flowchart illustrating a process for validating a Flowspec in accordance with an embodiment of the present disclosure.

FIG. 5 is a flowchart illustrating a process 500 for validating a Flowspec in accordance with an embodiment of the present disclosure. The process 500 can be performed by a network node (e.g., BGP router) of a receiving AS for verifying that a sending AS is authorized to issue the FlowSpec. The network node receives, at step 502, a BGP update message containing a Flowspec from a sending AS. The Flowspec is associated with the prefix of a particular AS or owner AS (i.e., an AS that owns or controls the prefix).

At step 504, the network node obtains an out-of-band Flowspec AS authorization list. Out-of-band means that the Flowspec AS authorization list is not part of the received BGP update message. In an embodiment, the Flowspec AS authorization list is obtained from an ROA database. As previously described, the ROA database may store a modified ROA that includes a FlowSpec authorization list that indicates one or more ASes authorized to send a Flowspec for a particular prefix (e.g., ROA 310 in FIG. 3). Alternatively, the ROA database may store a separate digitally signed FlowSpec authorization list object that indicates one or more ASes authorized to send a Flowspec for a particular prefix (e.g., FlowSpecAuthorization object 340 in FIG. 4). Although FIG. 5 depicts obtaining the out-of-band Flowspec AS authorization list after receiving the BGP update message containing a FlowSpec, in some embodiments, the network node obtains the out-of-band Flowspec AS authorization list prior to receiving a BGP update message containing the FlowSpec as part of the normal route authorization verification process.

At step 506, the network node determines whether the sending AS is on the Flowspec AS authorization list obtained from the ROA database. When the sending AS is not on the Flowspec AS authorization list, the network node, at step 520, rejects the BGP Flowspec in the BGP update message (i.e., does not filter traffic according to the received Flowspec).

The network node, at step 508, determines whether the sending AS is the left-most or closest neighboring AS to the receiving AS along the best-match unicast route for the destination prefix. In an embodiment, the network node determines that the sending AS is the left-most neighbor of the receiving AS when the sending AS is both in the left-most position of the AS_PATH attribute of a Flowspec route received via the eBGP and in the left-most position of the AS_PATH attribute of the best-match unicast route for the destination prefix embedded in the Flow spec NLRI. As stated above, the AS in the left-most position of the AS_PATH attribute is the AS that was last added to the AS_PATH attribute, which indicates the AS that last transmitted the BGP update message. In an embodiment, the receiving AS determines whether the sending AS is the closest neighboring AS to the receiving AS along the best-match unicast route for the destination prefix using a secured AS path list that is part of a routing table of the receiving AS.

In an embodiment, each BGP router or node on the secured AS path list is encrypted to ensure the validity of the secured AS path list. For example, in an embodiment, the secured AS path list is obtained using BGP Security (BGPsec). BGPsec is an extension to BGP that provides to receivers of valid BGPsec update messages cryptographic verification of the routes advertised in the BGPsec update messages. BGPsec can be used to verify that the sending AS is in the path to the prefix received. BGPsec replaces the BGP AS_PATH attribute with a new BGPsec_Path attribute. In an embodiment, the BGPsec_Path attribute is an optional non-transitive BGP path attribute. For example, any AS that supports BGPsec has a private key associated with a Resource Public Key Infrastructure (RPKI) router certificate. An originating AS can generate a signature using the RPKI private key of the originating AS. The signature of the originating AS is then included in the BGPsec_Path attribute of a BGPsec update message advertised by the originating AS. Any BGP router along the path that forwards the BGPsec update message adds its signature using its private key to the BGPsec_Path attribute of the BGPsec update message. An AS that receives the BGPsec update message uses the public keys of the BGP routers to verify the signatures. The digital signatures provide confidence that every AS on the path of ASes listed in the BGPsec update message has explicitly authorized the advertisement of the route. Thus, BGPsec can provide full path validation and protect against the man in the middle attack. In an embodiment, to verify that a receiving BGP router has this security capability, BGP capability can be negotiated between BGP routers prior to sending a FlowSpec AS authorization list.

When the sending AS is not the closest neighboring AS to the receiving AS along the best-match unicast route for the destination prefix (i.e., the left-most neighbor), the network node, at step 520, rejects the BGP Flowspec in the BGP update message. When the sending AS is both the left-most neighbor of the receiving AS and is on the Flowspec AS authorization list, the network node, at step 510, accepts the BGP Flowspec in the BGP update message. Thus, because the Flowspec AS authorization list in the ROA (or as a separate object) indicates whether the sending AS is valid, and because BGPSec indicates the path through which the BGP update message was sent (both pieces of information are cryptographically signed), the receiving AS can conclude that the Flowspec has a valid origin when the Flowspec is received from an AS in the signed AS PATH. Therefore, only an AS in the path can use Flowspec to request its neighbor to perform an action corresponding to the Flowspec.

At step 512, the network node receives network traffic. The network node determines, at step 514, whether the network traffic matches the criteria of the Flowspec specified in the BGP update message. At step 516, when the network traffic matches the criteria of the Flowspec, the network node performs the action associated with the Flowspec on network traffic (e.g., drops the packet). In an embodiment, the action associated with the Flowspec is specified in the BGP update message using a BGP Extended Community encoding format. Community information is included as a path attribute in BGP update message.

When the network traffic does not match the criteria of the Flowspec, the network node, at step 518, processes the network traffic as normal (e.g., forwarding the packets to the destination node).

Figure 6:
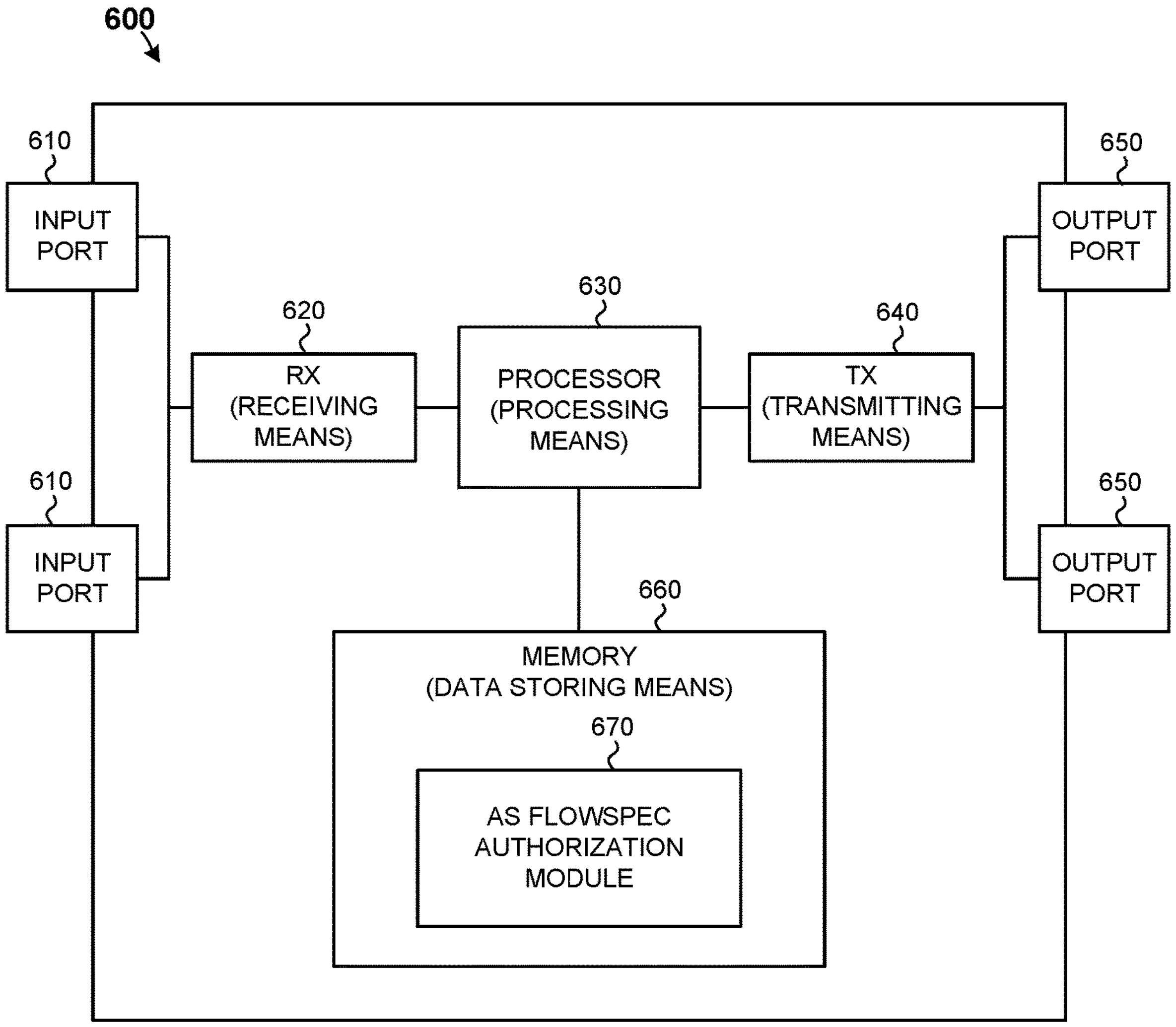
FIG. 6 is a schematic diagram illustrating an apparatus in accordance with an embodiment of the present disclosure.

FIG. 6 is a schematic diagram illustrating an apparatus 600 in accordance with an embodiment of the present disclosure. The apparatus 600 may be used to implement various embodiments of a network node or BGP router as disclosed herein. The apparatus 600 includes a receiver unit (RX) 620 or receiving means for receiving data via one or more input ports 610. The apparatus 600 also includes a transmitter unit (TX) 640 or transmitting means for transmitting or forwarding data out of one or more output ports 650. In some embodiments, the RX 620 and the TX 640 may be combined into a single transceiver unit. Additionally, an input port 610 and output port 650 may be combined into a bidirectional port.

The apparatus 600 includes a memory 660 or data storing means for storing the instructions and various data. The memory 660 can be any type of or combination of memory components capable of storing data and/or instructions. For example, the memory 660 can include volatile and/or non-volatile memory such as read-only memory (ROM), random access memory (RAM), ternary content-addressable memory (TCAM), and/or static random-access memory (SRAM). The memory 660 can also include one or more disks, tape drives, and solid-state drives. In some embodiments, the memory 660 can be used as an over-flow data storage device or buffer to store programs when such programs are selected for execution, and to store instructions and data that are read during program execution.

The apparatus 600 has one or more processors 630 or other processing means to process instructions. In some embodiments, the processor 630 may be a central processing unit (CPU) chip having one or more processing cores, a field-programmable gate array (FPGA), an application specific integrated circuit (ASIC), and/or a digital signal processor (DSP). The processor 630 is communicatively coupled via a system bus with the ingress ports 610, RX 620, TX 640, egress ports 650, and memory 660. The processor 630 can be configured to execute instructions stored in the memory 660. Thus, the processor 630 provides a means for performing any computational, comparison, determination, initiation, or configuration steps, or any other action, corresponding to the claims or disclosure when the appropriate instruction is executed by the processor. In some embodiments, the memory 660 can be memory that is integrated with the processor 630.

In one embodiment, the memory 660 stores an AS Flowspec authorization module 670. The AS Flowspec authorization module 670 includes data and executable instructions for implementing the disclosed embodiments. For instance, the AS Flowspec authorization module 670 can include instructions for implementing the method described in FIG. 5. The inclusion of the AS Flowspec authorization module 670 provides a technical improvement to the functionality of the apparatus 600 by enabling the apparatus 600 to ensure the validity of a Flowspec.

In some embodiments, the apparatus 600 may include additional modules for performing any one of or combination of steps described in the embodiments. A module may include a particular set of functions, software instructions, or circuitry that is configured to perform a specific task. Further, any of the additional or alternative embodiments or aspects of the method, as shown in any of the figures or recited in any of the claims, are also contemplated to include similar modules.

Certain embodiments may be implemented as a system, an apparatus, a method, and/or a computer program product. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network node of a receiving autonomous system (AS) for verifying that a sending AS is authorized to issue a Border Gateway Protocol (BGP) flow specification (FlowSpec), the method comprising:
- receiving a BGP update message from the sending AS, the BGP update message comprising a FlowSpec associated with a prefix of an AS;
- obtaining an out-of-band Flowspec AS authorization list indicating autonomous systems (ASes) that are authorized to issue the FlowSpec for the prefix of the AS;
- determining that the sending AS is authorized to issue the FlowSpec when the sending AS is included on the out-of-band FlowSpec AS authorization list for the prefix of the AS;
- determining whether the sending AS is a closest neighboring AS to the receiving AS along a best-match unicast route for a destination prefix;
- accepting the FlowSpec when the sending AS is the closest neighboring AS to the receiving AS along the best-match unicast route for the destination prefix and the sending AS is authorized to issue the FlowSpec for the prefix of the AS; and
- performing a traffic flow action associated with the FlowSpec when the network node receives traffic that matches a set of traffic parameters specified by the FlowSpec.

2. The method of claim 1, further comprising rejecting the FlowSpec when the sending AS is not included on the out-of-band FlowSpec AS authorization list.

3. The method of claim 1, further comprising rejecting the FlowSpec when the sending AS is not the closest neighboring AS to the receiving AS along the best-match unicast route for the destination prefix.

4. The method of claim 1, wherein the out-of-band Flowspec AS authorization list is encoded in a digitally signed Route Origin Authorization (ROA) object.

5. The method of claim 1, wherein the out-of-band Flowspec AS authorization list is encoded in a digitally signed Flowspec AS authorization list object.

6. The method of claim 5, wherein the digitally signed Flowspec AS authorization list object is obtained from a resource public key infrastructure (RPKI) repository.

7. The method of claim 1, wherein determining whether the sending AS is the closest neighboring AS to the receiving AS along the best-match unicast route for the destination prefix comprises determining whether the sending AS is both in a left-most position of an AS_PATH attribute of a Flowspec route received via an External Border Gateway Protocol (eBGP) and in the left-most position of the AS_PATH attribute of the best-match unicast route for the destination prefix embedded in the Flowspec.

8. The method of claim 1, wherein determining whether the sending AS is the closest neighboring AS to the receiving AS along the best-match unicast route for the destination prefix comprises using a secured AS path list that is part of a routing table of the network node.

9. The method of claim 8, wherein the secured AS path list is obtained using BGP security (BGPsec).

10. A network node of a receiving autonomous system (AS) comprising:
- a memory storing instructions;
- a processor coupled to the memory, the processor configured to execute the instructions to cause the network node to:
  - receive a BGP update message from a sending AS, the BGP update message comprising a FlowSpec associated with a prefix of an AS;
  - obtain an out-of-band Flowspec AS authorization list indicating autonomous systems (ASes) that are authorized to issue the FlowSpec for the prefix of the AS;
  - determine that the sending AS is authorized to issue the FlowSpec when the sending AS is included on the out-of-band FlowSpec AS authorization list for the prefix of the AS;
  - determine whether the sending AS is a closest neighboring AS to the receiving AS along a best-match unicast route for a destination prefix;
  - accept the FlowSpec when the sending AS is the closest neighboring AS to the receiving AS along the best-match unicast route for the destination prefix and the sending AS is authorized to issue the FlowSpec for the prefix of the AS; and
  - perform a traffic flow action associated with the FlowSpec when the network node receives traffic that matches a set of traffic parameters specified by the FlowSpec.

11. The network node of claim 10, wherein the processor is configured to execute the instructions to cause the network node to reject the FlowSpec when the sending AS is not included on the out-of-band FlowSpec AS authorization list.

12. The network node of claim 10, wherein the processor is configured to execute the instructions to cause the network node to reject the FlowSpec when the sending AS is not the closest neighboring AS to the receiving AS along the best-match unicast route for the destination prefix.

13. The network node of claim 10, wherein the out-of-band Flowspec AS authorization list is encoded in a digitally signed Route Origin Authorization (ROA) object.

14. The network node of claim 10, wherein the out-of-band Flowspec AS authorization list is encoded in a digitally signed Flowspec AS authorization list object.

15. The network node of claim 14, wherein the digitally signed Flowspec AS authorization list object is obtained from a resource public key infrastructure (RPKI) repository.

16. The network node of claim 10, wherein determining whether the sending AS is the closest neighboring AS to the receiving AS along the best-match unicast route for the destination prefix comprises determining whether the sending AS is both in a left-most position of an AS_PATH attribute of a Flowspec route received via an External Border Gateway Protocol (eBGP) and in the left-most position of the AS_PATH attribute of the best-match unicast route for the destination prefix embedded in the Flowspec.

17. The network node of claim 10, wherein determining whether the sending AS is the closest neighboring AS to the receiving AS along the best-match unicast route for the destination prefix comprises using a secured AS path list that is part of a routing table of the network node.

18. The network node of claim 17, wherein the secured AS path list is obtained using BGP security (BGPsec).

* * * * *